(12) United States Patent
Chen

(10) Patent No.: US 7,635,015 B2
(45) Date of Patent: Dec. 22, 2009

(54) FACE MASK MANUFACTURING MACHINE

(76) Inventor: Hung-Ho Chen, 1/F., No. 19, Alley 7, Lane 195, Yung Feng Rd., Tu Cheng City, Taipei (TW)

( * ) Notice: Subject to any disclaimer, the term of this patent is extended or adjusted under 35 U.S.C. 154(b) by 462 days.

(21) Appl. No.: 11/735,497

(22) Filed: Apr. 16, 2007

(65) Prior Publication Data

US 2008/0251214 A1  Oct. 16, 2008

(51) Int. Cl.
  *B29C 65/08* (2006.01)
  *B29C 53/04* (2006.01)
(52) U.S. Cl. .................. 156/461; 156/465; 156/510; 156/580.1
(58) Field of Classification Search .............. 156/200, 156/204, 226, 227, 461, 465
  See application file for complete search history.

(56) References Cited

U.S. PATENT DOCUMENTS 5,614,057 A * 3/1997 Conley et al. ............... 156/354
6,261,401 B1 * 7/2001 Pagan ......................... 156/182

* cited by examiner

*Primary Examiner*—Richard Crispino
*Assistant Examiner*—Barbara J. Musser
(74) *Attorney, Agent, or Firm*—Leong C. Lei

(57) ABSTRACT

A face mask manufacturing machine includes a platform, a first-side edge fusion module, a second-side edge fusion module, a folding device, and a center line fusion module. The first-side and second-side edge fusion modules and the center line fusion module each comprise a pneumatic cylinder, which is operatively coupled to automatic control facility for carrying out automatic operation to thereby reduce the labor needed for operating fusion facility and enhance manufacturing efficiency.

7 Claims, 18 Drawing Sheets

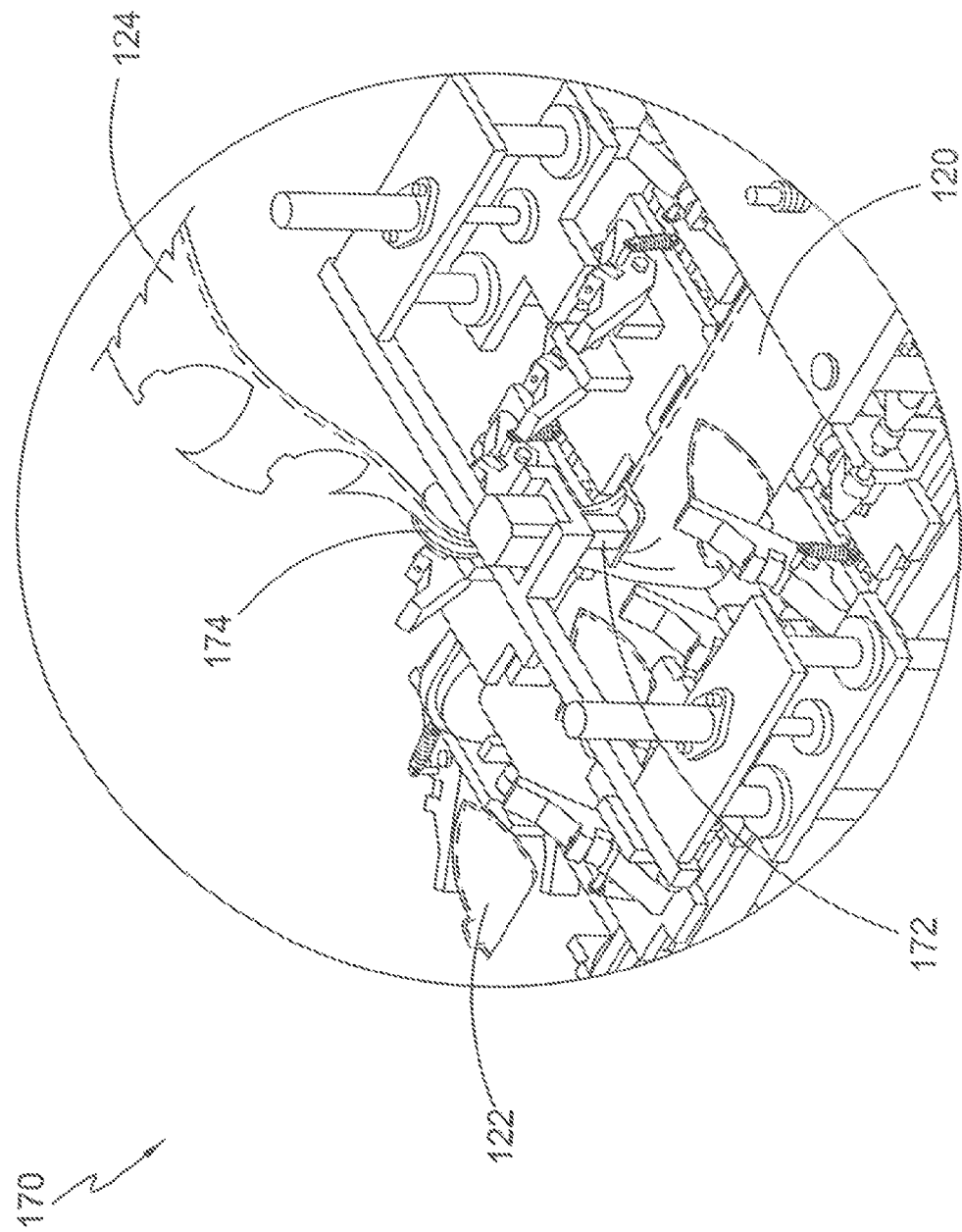

FACE MASK MANUFACTURING MACHINE

BACKGROUND OF THE INVENTION (a) Technical Field of the Invention

The present invention relates to a face mask manufacturing machine, and in particular to a face mask manufacturing machine that fully automatic to thereby reduce the operation labors and avoid negative influence on the feeding and fusion efficiency caused by inconsistency of human operation.

(b) Description of the Prior Art

A face mask is often used to isolate and shielding against dusts, contaminations and bacteria or viruses. The face mask is almost a must at the time when a disease is transmitted through air.

The face mask is also used by for example a motorcycle riders, a cooker, or a chemical facility operator and is used in potentially toxicant environments, such as oil refinery facility and chemical plants. The face mask helps to prevent the operators from taking in excessive amount of toxicant substance or materials. However, the mask itself is subject to contamination and/or deterioration of performance thereof after it has been used for a long time. Thus, a new mask must be used to replace the old, contaminated or performance-reduced mask. As a result of the frequent replacement of the face masks, the manufactures of face mask must be fully capable to supply a large quantity of face mask in certain situations in order to satisfy the need of the market.

Currently, the face mask is formed by an initial process of first folding a piece of multilayer cloth, followed by fusion. A subsequent intermediate process including sewing and cutting is then carried out to form a semi-finished product of face mask. Thereafter, accessories, such as a nose clip, are then added to the semi-finished product in a further subsequent process to complete the making of the face mask. In these processes, a number of steps are assisted by human labors. For example, the raw material is fed manually and the fusion operation is also carried out manually. Under this condition, the individual performance of the operators that carry out the above discussed operations may has significant influence on the manufacturing speed and precision of the semi-finished products of the face mask an also have influence on the quality and throughput of face masks.

Thus, the present invention is aimed to overcome the above discussed problems by providing a face mask manufacturing machine that can operate in an automatic manner.

SUMMARY OF THE INVENTION

The primary purpose of the present invention is to in view of the above, the present invention provides a free mask manufacturing machine that overcomes the drawback of the prior art that a lot of human labor is needed in the manufacturing of face masks.

Thus, an objective of the present invention is to provide a face mask manufacturing machine comprising a mask fusion apparatus, the mask fusion apparatus comprising:

a platform;

a first-side edge colon module arranged on the platform, comprising a frame, at least one first pneumatic cylinder, a first fusion die, a first ultrasonic heating device, and a first die cushion, the frame being arranged on and extending from a top surface of the platform, the first pneumatic cylinder being mounted to the frame and having a vertically movable linear shaft, the first fusion module being mounted to a lower end of the linear shaft to press onto a multilayer cloth to form a first-side edge contour of the mask, the first ultrasonic heating device being mounted to the frame and coupled to the first fusion die in order to induce ultrasonic vibration on and thus heating the first fusion die to increase temperature of the first fusion die for heat-fusion of the first-side edge contour of the multilayer cloth, the first die cushion being arranged in the platform in a vertically moveable manner at a location below the first fusion die;

a second-side edge fusion module arranged on the platform and adjacent to the first-side edge fusion module in a forward direction, comprising a frame, at least one second pneumatic cylinder, a second fusion die, a second ultrasonic heating device, and a second die cushion, the frame being arranged on and extending from the top surface of the platform, the second pneumatic cylinder being mounted to the frame and having a vertically movable linear shaft, the second fusion module being mounted to a lower end of the linear shaft to press onto the multilayer cloth to form a second-side edge contour of the mask, the second ultrasonic heating device being mounted to the frame and coupled to the second fusion die in order to induce ultrasound vibration on and thus heating the second fusion die to increase temperature of the second fusion die for heat-fusion of the second-side edge contour of the multilayer cloth, the second die cushion being arranged in the platform in a vertically movable manner at a location below the second fusion die;

a folding device arranged on the platform and adjacent to the second-side edge fusion module in the forward direction, comprising a guide board assembly and a guide roller set, the guide board assembly being arranged on the platform and comprising a guide board, which has a forward end portion forming a conic shape and an expanded rearward end portion opposing the second-side edge lesion module for guiding the multilayer cloth toward the forward end portion thereof for folding the multilayer cloth, the guide roller set being arranged on the top surface of the platform and adjacent to the forward end portion of the guide board, the guide roller set comprising two guide rollers that are horizontally adjacent to each other for driving the folded multilayer cloth through therebetween; and a center line fusion module arranged on the top surface of the platform and adjacent to the folding device, the center line fusion module comprising a frame, at least one third pneumatic cylinder, a third fusion die, a third ultrasonic heating device, and a third die cushion, the frame being arranged on and extending from the top surface of the platform, the third pneumatic cylinder being mounted to the frame and having a vertically movable linear shaft, the third fusion module being mounted to a lower end of the linear shaft to press onto the multilayer cloth to form a center line contour of the mask, the third ultrasonic heating device being mounted on the frame and coupled to the third fusion die in order to induce ultrasonic vibration on and thus heating the third fusion die to increase temperature of the third fusion die for heat-fusion of the center line contour of the multilayer cloth, the third die cushion being arranged in the platform in a vertically movable manner at a location below the third fusion die.

The platform is provided with a feed roller set arranged at a rearward side of the first-side edge fusion module, the feed roller set being arranged on the top surface of the platform and comprising two brackets and two feed rollers, the brackets being mounted on the top surface of the platform, the feed rollers being rotatably mounted between the brackets and vertically adjacent to each other for driving the multilayer cloth through between the feed rollers for conveying foe multilayer cloth in the forward direction toward the first-side edgy fusion module.

The platform is further provided with a conveyance roller set arranged between the second-side edge fusion module and the folding device, the conveyance roller set comprising two brackets and two conveyance rollers, the brackets being mounted on the top surface of the platform, the conveyance rollers being rotatably mounted between the brackets and vertically adjacent to each other for driving the multilayer cloth through between the conveyance rollers and conveying the multilayer cloth toward the folding device.

The guide board assembly of the folding device comprises two support brackets and a support roller, the support brackets being mounted on the top surface of the platform and adjacent to the conveyance roller set in the forward direction, the support roller being rotatably mounted between the support brackets to support the multilayer cloth, the guide beard being mounted to the brackets.

The guide roller set comprises two brackets mounted to the top surface of the platform, the guide rollers being rotatably mounted between the brackets.

The platform is further provided with a conveyance roller set arranged between the folding device and the center line fusion module, the conveyance roller set comprising two brackets and two conveyance rollers, the brackets being mounted on the top surface of platform, the conveyance rollers being rotatably mounted between the brackets and vertically adjacent to each other for driving the multilayer cloth through between the conveyance rollers and conveying the multilayer cloth toward the center line lesion module.

In the above arrangement, the first, second, and third pneumatic cylinders can be connected to automatic control facility, such as an industrial computer, to automatically carry out fusion operation on the multilayer cloth with the fusion dies. This eliminates the need of human labor for operating fusion facility thereby reducing the inconsistency of quality caused by human error and enhancing throughput of face masks. Consequently, the quality of face mask, can be enhanced and the costs reduced.

The face mask manufacturing machine may further comprises a mask cutting apparatus, which is arranged next to the mask lesion apparatus at a location adjacent to the center line fusion module, the mask curling apparatus comprising:

a table having a top surface on which two rails are mounted, two caterpillar track sets being further provided on the top surface of the table and corresponding to the rails respectively, each caterpillar track set comprising a plurality of rollers rotatably mounted to the table and a caterpillar band surrounding the rollers;

two carrier sets respectively coupled to the caterpillar track sets for circulatory movement along the caterpillar track, each carrier set comprising a plurality of carriers arranged along the corresponding caterpillar band, each carrier comprising a chassis and a plurality of clamps pivotally mounted to the chassis for selectively clamping a mask material;

two closing mechanisms arranged on opposite edge portions of a rearward end portion of the table and corresponding to the caterpillar track sets respectively, each closing mechanism comprising a frame, a first pneumatic cylinder, and a push board, the name being mounted to the table, the first pneumatic cylinder being mounted to a top end of the frame and having a vertically movable linear shall, the push board being mounted to an end of the linear shaft and being operable to engage and thus upward push, the clamps of the carrier that is moved along the caterpillar track to a location corresponding to the closing mechanism, so as to rotate the clamps with respect to the chassis thereby dosing the clamps to allow the clamps and the chassis of the carrier to grip the mask material therebetween;

a cutting mechanism arranged on the table and located above the rails and the carrier sets, the cutting mechanism comprising a support frame, a cutter die cushion, an upper hydraulic cylinder, and a cutter die, the cutter die cushion being arranged in the top surface of the table in a vertically movable manner the upper hydraulic cylinder being mounted to the support frame and adjacent to the cutter die and having a vertically movable linear shaft, the cutter die being arranged at a location corresponding to a space between the two rails and in alignment with the cutter die cushion and the mask material, the cutter die being mounted to a lower end of the linear shaft of the upper hydraulic cylinder and being vertically movable therewith to cooperate with upward movement of the cutter die cushion to clamp the mask material for cutting;

two opening mechanisms arranged on opposite edge portions of a forward end portion of the table and corresponding to the caterpillar track sets respectively and adjacent to the cutting mechanism, each opening mechanism composing a frame, a third pneumatic cylinder, and a depressing board, the frame being mounted to the table, the third pneumatic cylinder being mounted to a top end of the frame and having a vertically movable linear shaft the depressing board being mounted to an end of the linear shall and being operable to downward depress the clamps of the carrier that is moved along the caterpillar track to a location corresponding to the opening mechanism so as to rotate the clamps with respect to the chassis to thereby open the clamps; and a waste clearing device arranged on the table at the forward end portion thereof and adjacent to the opening mechanisms, the waste clearing device comprising a crossbar, a drive roller, a pneumatic cylinder, and a drive rod, the crossbar being mourned between the frames of the opening mechanisms, the drive roller being rotatably mounted to the crossbar to allow a length of waste of the mask material to wrap therearound, the pneumatic cylinder being mounted to the crossbar and adjacent to the drive roller, the drive rod being coupled to the pneumatic cylinder in vertically movable manner to selectively depress against the waste so as to pull and drag the waste.

The foregoing object and summary provide only a brief introduction to the present, invention. To fully appreciate these and other objects of the present invention as well as the invention, itself all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 12 is an enlarged perspective view illustrating the operation of a waste clearing device of the mask cutting apparatus of the present invention.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various chances to the described embodiments may be made in the function and arrangement of the elements described without departing from the scope of the invention as set forth in the appended claims.

Figure 1A:
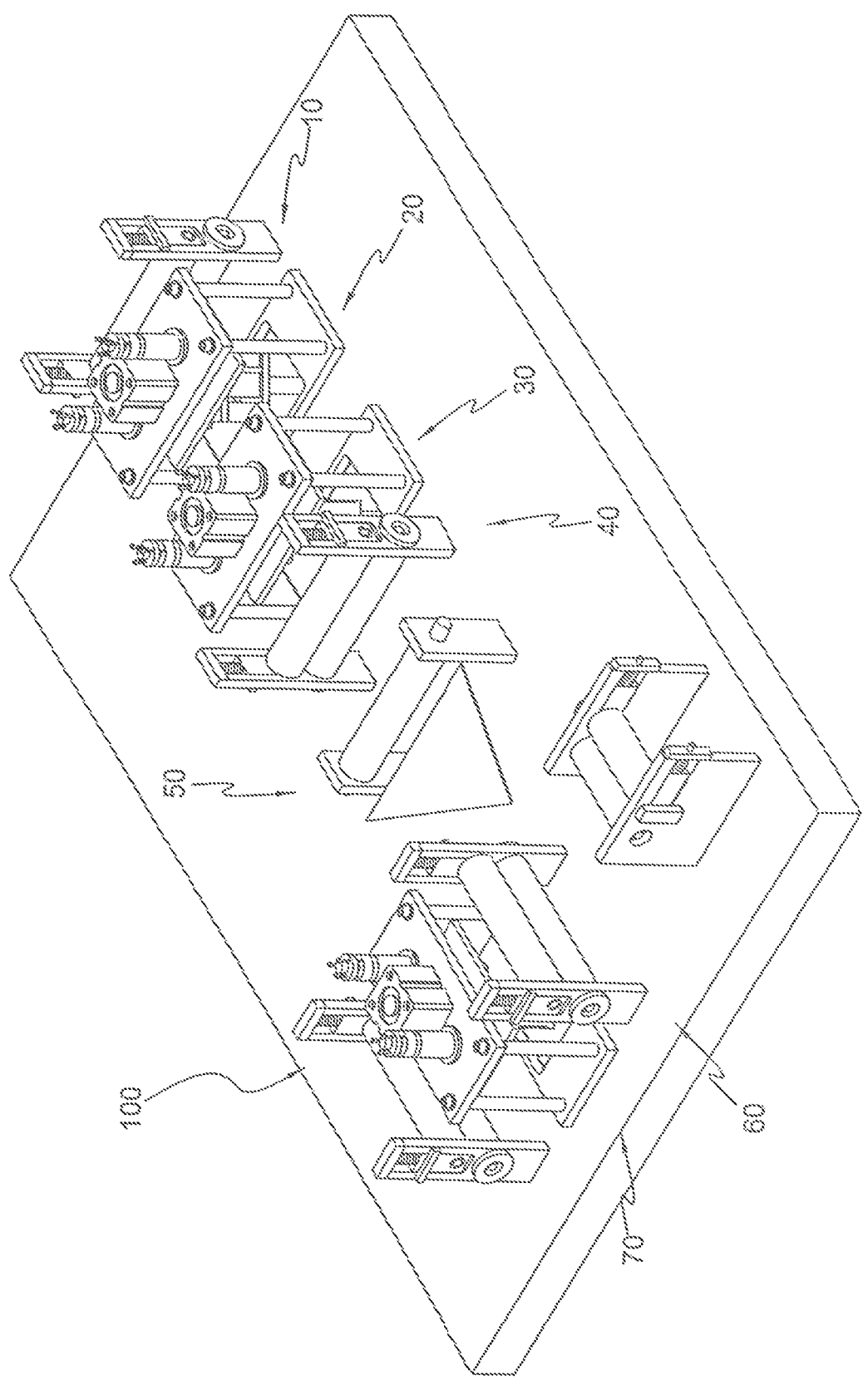
FIG. 1A is a perspective view showing a mask lesion apparatus of a face mask manufacturing machine constructed in accordance with the present invention.
Figure 1B:
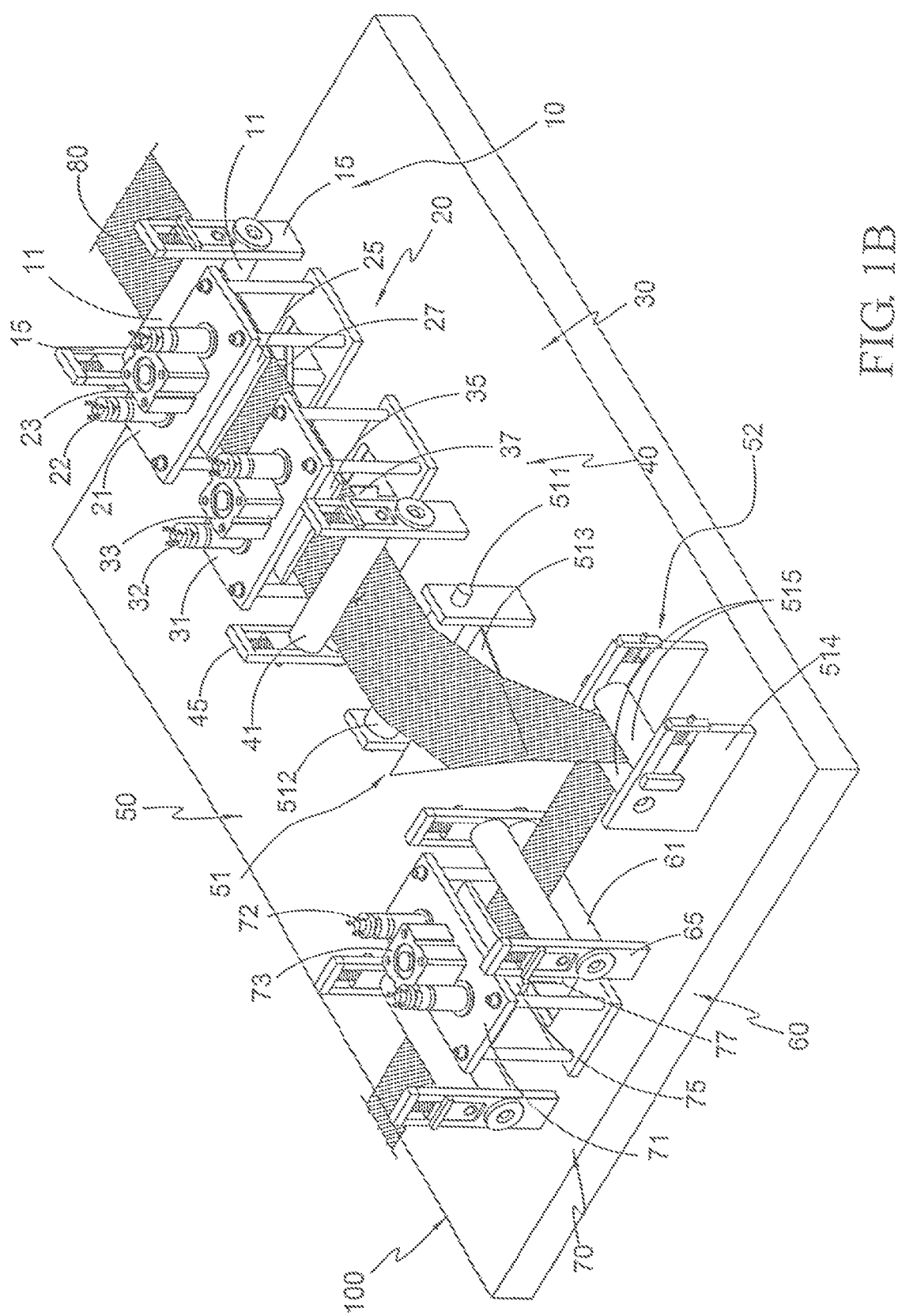
FIG. 1B is a perspective view showing the operation of the mask, fusion apparatus of the present invention in making face masks.
Figure 6:
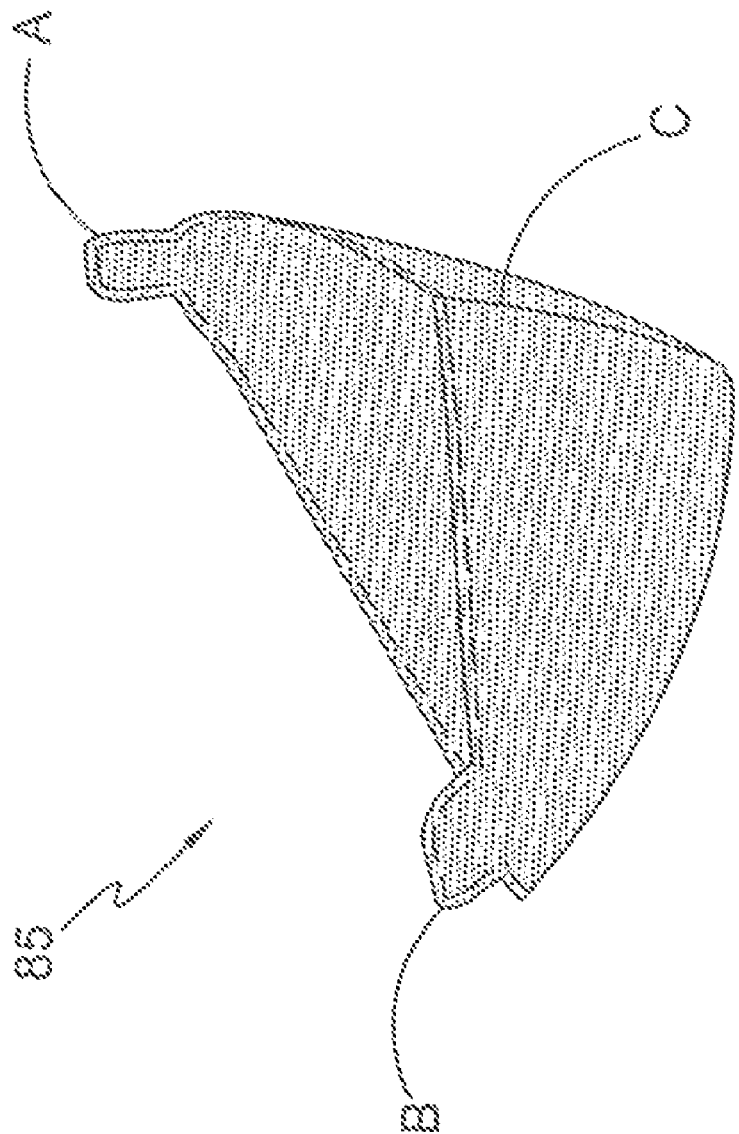
FIG. 6 is perspective view of first semi-finished face mask with the face mask manufacturing machine of the present inversion.
Figure 7:
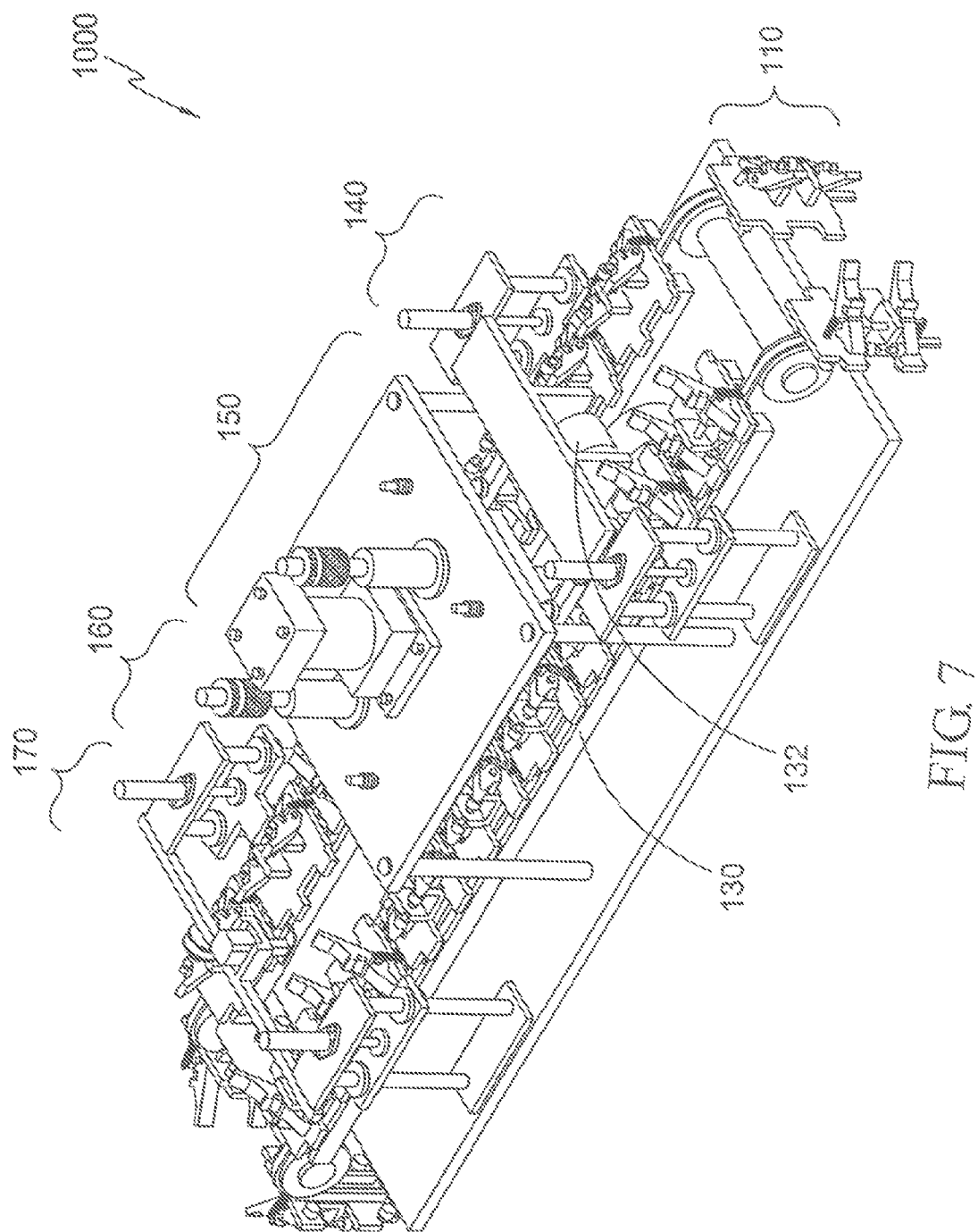
FIG. 7 is a perspective view illustrating a mask cutting apparatus of the face mask manufacturing machine in accordance with the present invention.
Figure 8A:
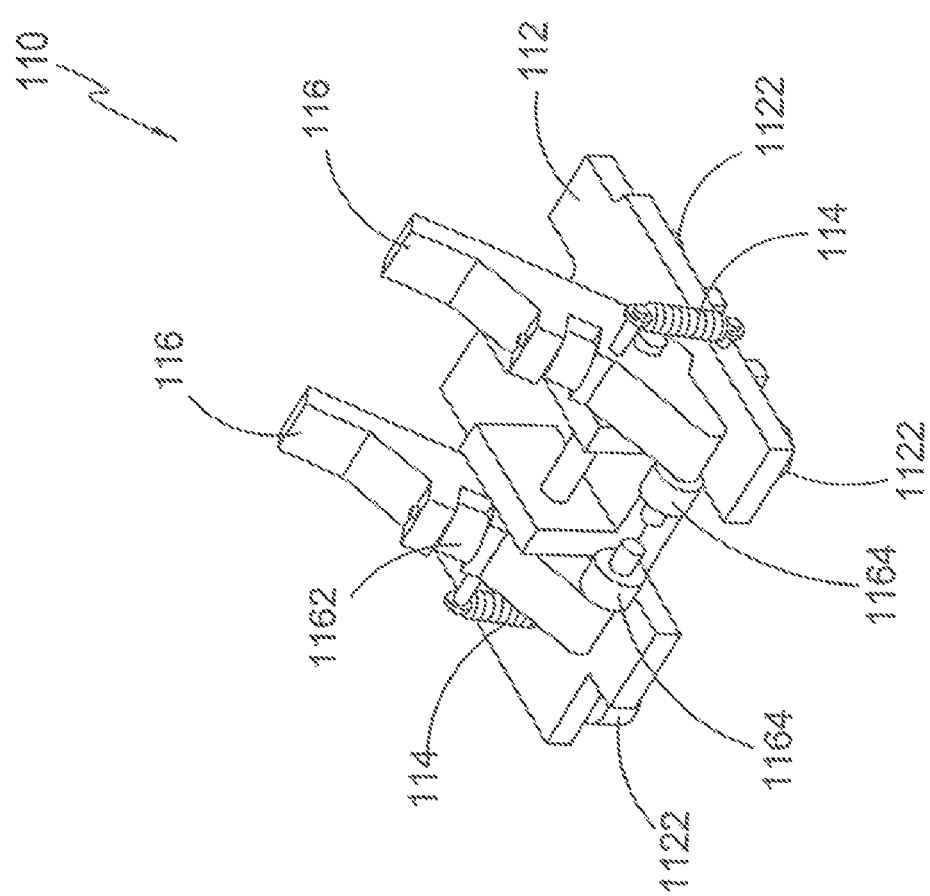
FIGS. 8A and 8B are perspective views of a carrier of the mask cutting apparatus of the present invention.
Figure 8B:
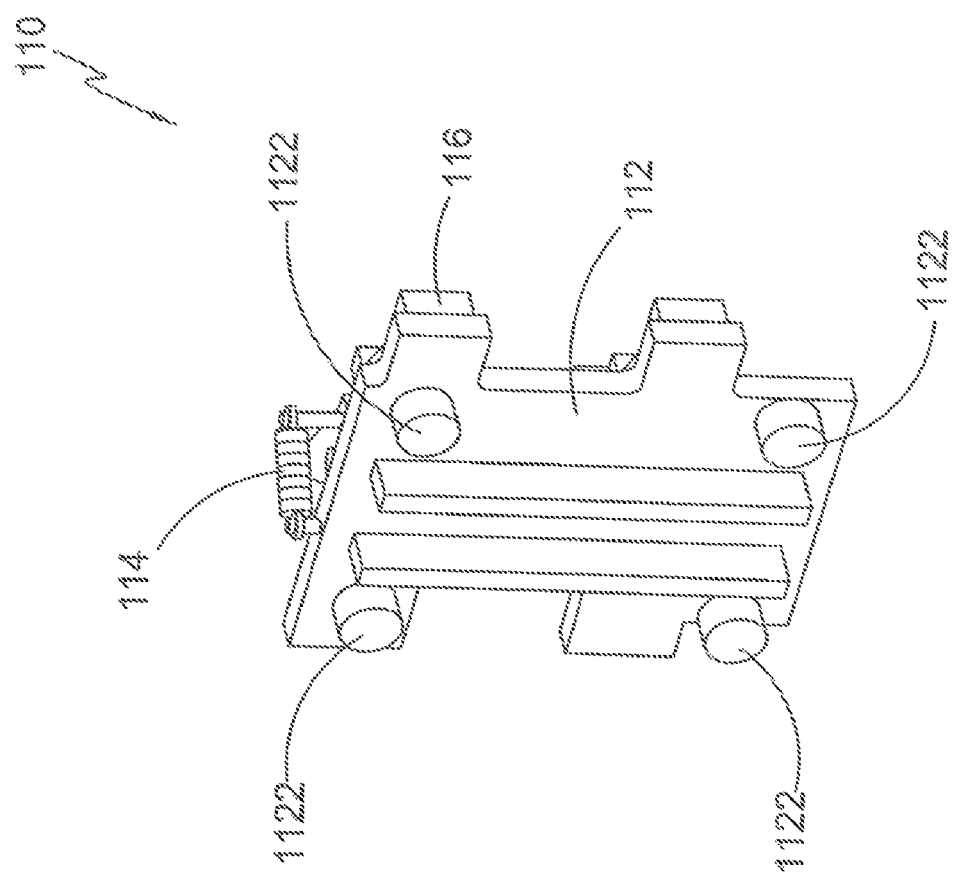
Figure 13:
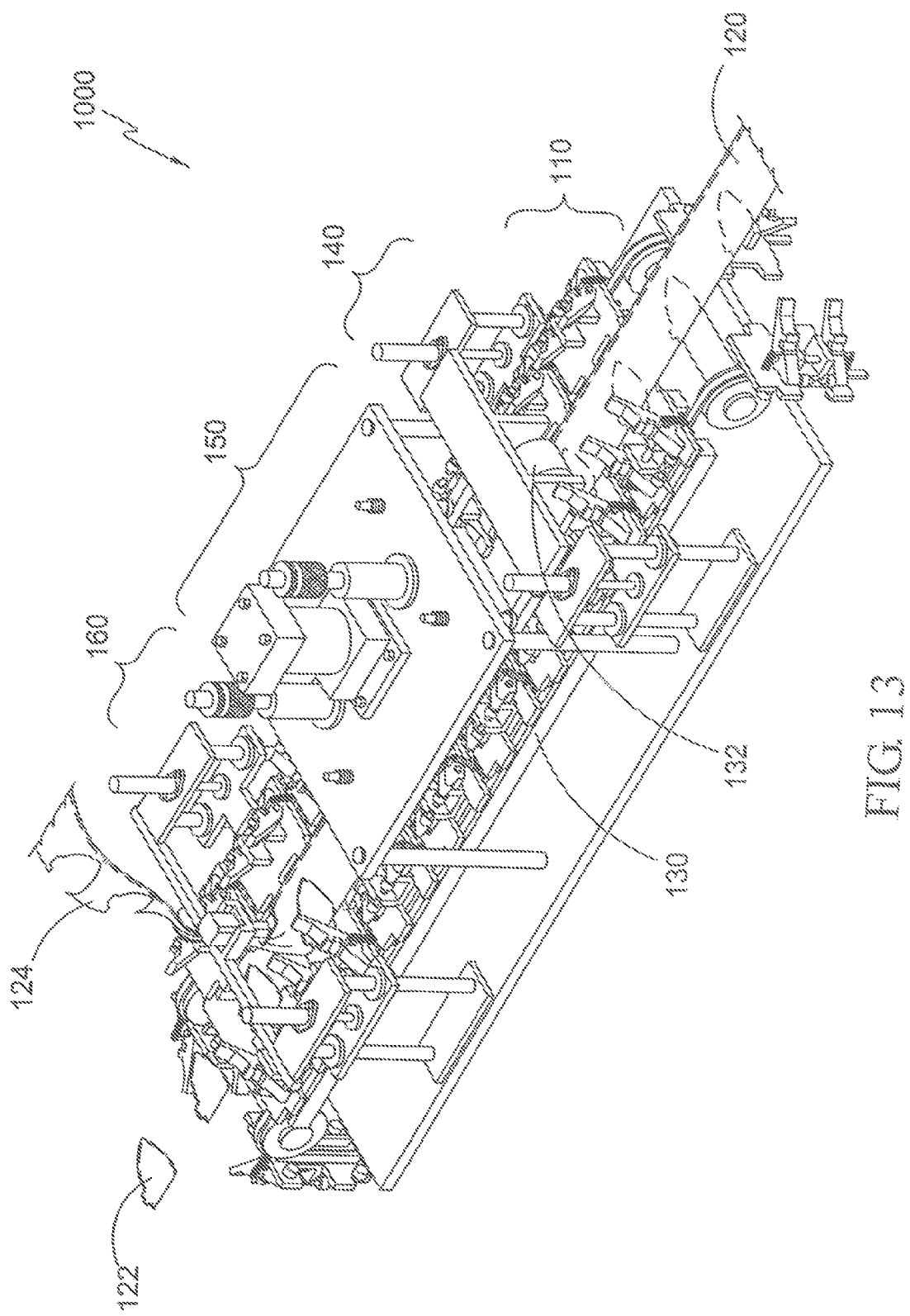
FIG. 13 is a perspective view illustrating the operation of the mask cutting apparatus of the present invention in making face masks.

With reference to the drawings, a face mask manufacturing machine constructed in accordance with the present invention generally comprises a mask fusion apparatus, which is particularly shown in FIGS. 1A and 1B, and a mask cutting apparatus, which is particularly shown in FIGS. 7 and 13. The fusion apparatus and the mask cubing apparatus will be separately described hereinafter, with reference to FIGS. 1-13.

With reference to FIGS. 1A and 1B, the mask fusion apparatus comprises: a platform 100, a feed roller set 10, a first-side edge fusion module 20, a second-side edge fusion module 30, a first conveyance roller set 40, a folding device 50, a second conveyance roller set 60, and a center line fusion module 70.

Figure 2:
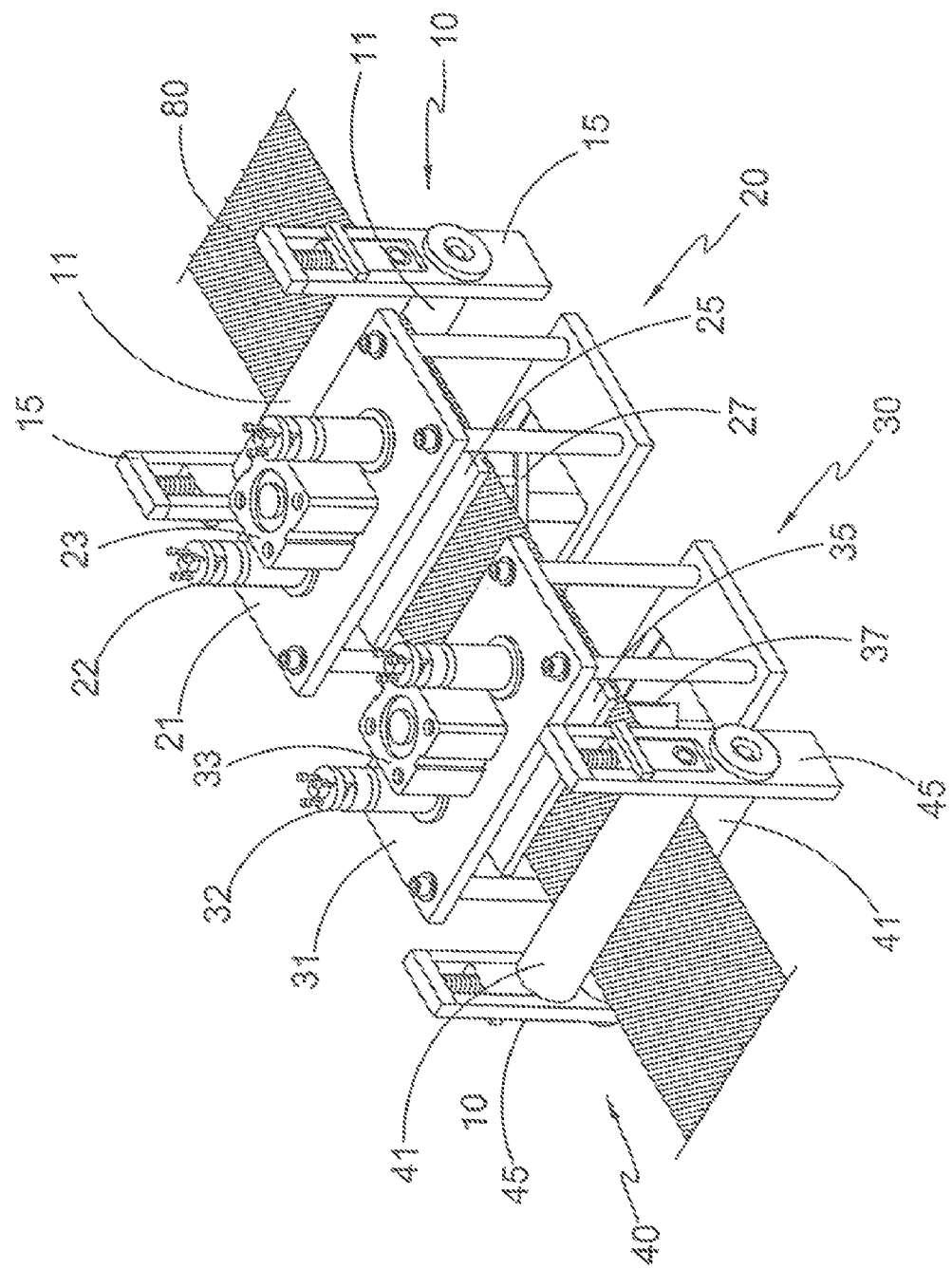
FIG. 2 is a perspective views showing a first-side edge fusion module and a second-side edge fusion module of the mask fusion apparatus of the present invention.
Figure 3:
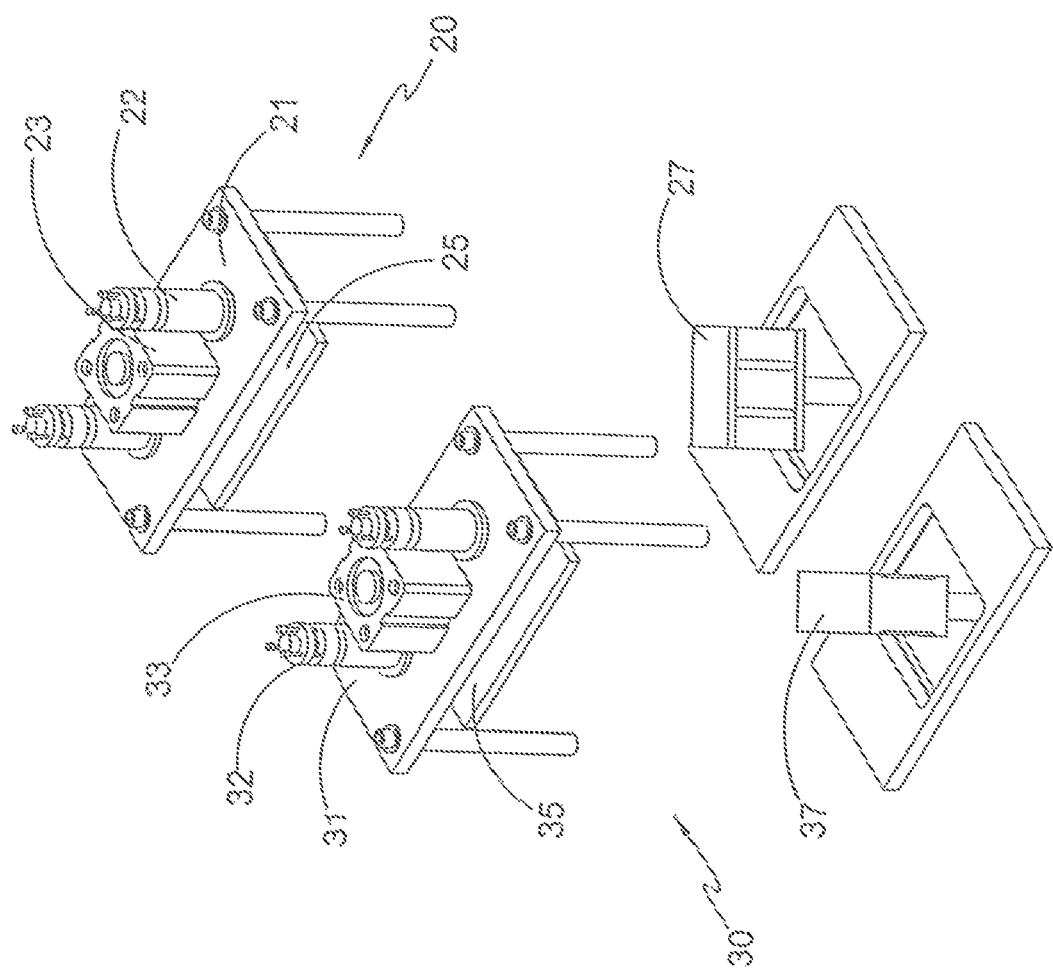
FIG. 3 is an exploded view of the first-side edge fusion module and the second-side edge fusion modulo of the mask fusion apparatus of the present invention.

Also referring to FIGS. 2 and 3, the first-side edge fusion module 20 is arranged on the platform 100 and comprises a frame, at least one first pneumatic cylinder 22, a host fusion die 25, a first ultrasonic heating device 23, and a first die cushion 27. The frame is arranged on and extends from a top surface of the platform 100 and comprises a top board 21. The first pneumatic cylinder 22 is mounted to the top board 21 of the frame and has a vertically movable linear shaft. The first fusion module 25 is mounted to a lower end of the linear shaft to press onto a multilayer cloth 80 to form a first-side edge contour A of the mask, as shown in FIG. 6. The first ultrasonic heating device 23 is mounted to the top board 21 of the frame and is coupled to the first fusion die 25 in order to induce ultrasonic vibration on and thus heating the first fusion die 25 to increase temperature of the first fusion die 25 for heat-fusion of the first-side edge contour A of the multilayer cloth 80. With this arrangement and operation, the layers of foe multilayer cloth 80 at corresponding locations are fused together. The first die cushion 27 is arranged in the platform 100 in a vertically movable manner at a location below the first fusion die 25 in order to support the first fusion die 25. The second-side edge fusion module 30 is arranged on the platform 100 and is adjacent to the first-side edge fusion module 20 in a forward direction. The second-side edge fusion module 30 comprises a frame, at least one second pneumatic cylinder 32, a second fusion die 35, a second ultrasonic heating device 33, and a second die cushion 37. The frame is arranged on and extends from the top surface of the platform 100 and comprises a top board 31. The second pneumatic cylinder 32 is mounted to the top board 31 of the frame and has a vertically movable linear shall. The second fusion module 35 is mounted to a lower end of the linear shaft to press onto the multilayer cloth 80 to form a second-side edge contour B of the mask, as shown in FIG. 6. The second ultrasound heating device 33 is mounted to the top board 31 of the frame is coupled to the second fusion die 35 in order to induce ultrasonic vibration on and thus heating the second fusion die 35 to increase temperature of the second fusion die 35 for heat-fusion of die second-side edge contour B of the multilayer cloth 80. The set one die cushion 37 is arranged in the platform 100 in a vertically moveable manner at a location below the second fusion die 35 in order to support the second fusion die 35.

The folding device 50 is arranged on the platform 100 and is adjacent to the second-side edge fusion module 30 in the forward direction. The folding device 50 comprises a guide board assembly 51 and a guide roller set 52.

The guide board assembly 51 is arranged on the platform 100 and comprises a guide board 513, which has a forward end portion forming a conic shape and an expanded rearward end portion opposing the second-side edge fusion module 30 for guiding the multilayer cloth 80 toward the forward end portion of the guide board 513 for folding the multilayer cloth 80.

Figure 4:
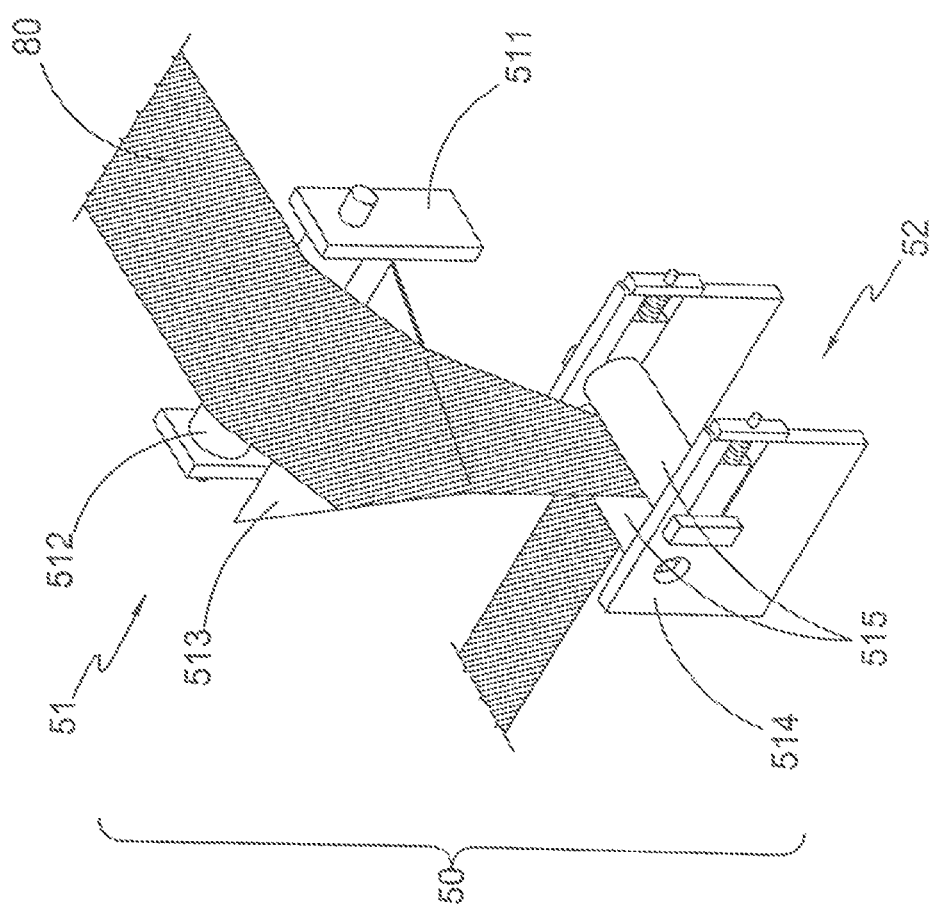
FIG. 4 is a perspective view of a folding device of the mask fusion apparatus of the present invention.

Also referring to FIG. 4, the guide roller set 52 is arranged on the top surface of die platform 100 and is adjacent to the forward end portion of the guide board 513. The guide roller set 52 composes two guide rollers 515 that are horizontally adjacent to each other for driving the folded multilayer cloth 80 between the guide rollers 515.

Figure 5:
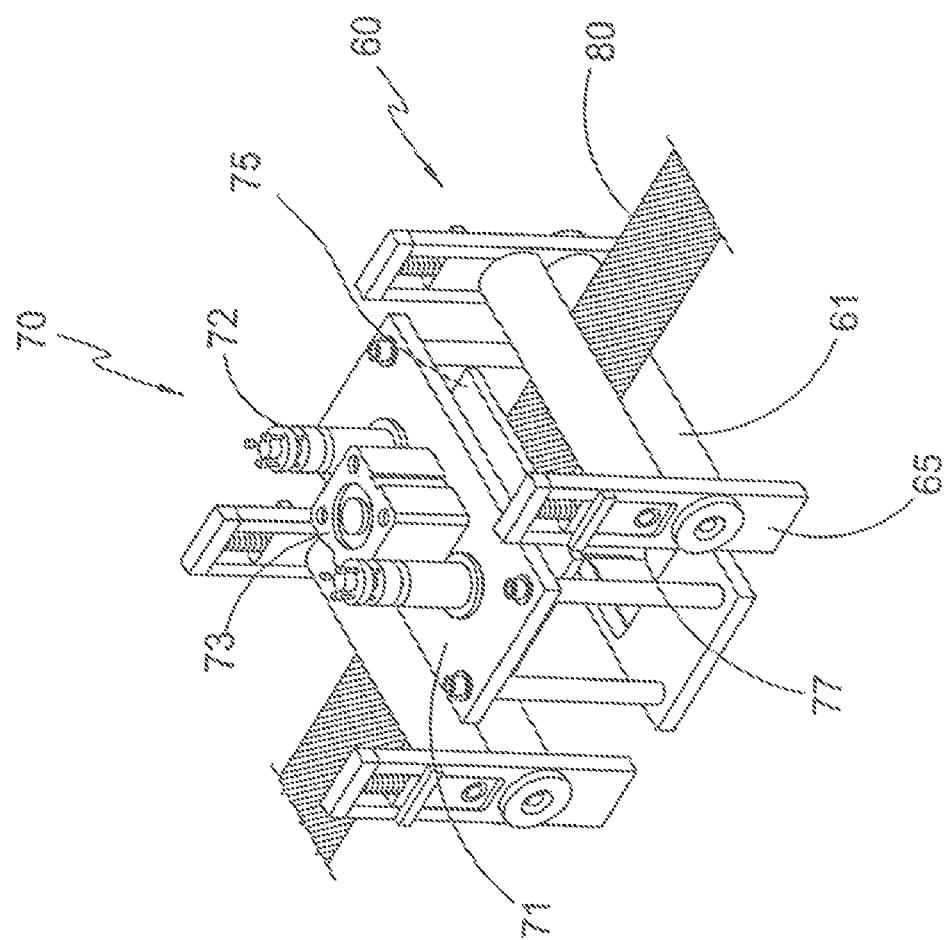
FIG. 5 is a perspective view of a center line fusion module of the mask fusion apparatus of the present invention.

Also referring to FIG. 5, the center line fusion module 70 is arranged on the top surface of the platform 100 and is adjacent to the guide roller set 52 of the folding device 50. The center line fusion module 70 comprises a frame, at least one third pneumatic cylinder 72, a third fusion, die 75, a third ultrasonic heating device 73, and a third die cushion 77. The frame is arranged on and extends from the top surface of the platform 100 and comprises a top board 71. The third pneumatic cylinder 72 is mounted to the top board 71 of the frame and has a vertically movable linear shaft. The third fusion module 75 is mounted to a lower end of the linear shaft to press onto the multilayer cloth 80 to form a center line contour C of the mask, as shown in FIG. 6. The third ultrasonic heating device 73 is mounted to the top board 71 of the frame and is coupled to the third fusion die 75 in order to induce ultrasonic vibration on and thus heating the third fusion die 75 to increase temperature of the third fusion die 75 for heat-fusion of the center hue contour C of the multilayer cloth 80. The third die cushion 77 is succeed in the platform 100 in a vertically movable manner at a location below the third fusion die 75 in order to support the third fusion die 75 and the multilayer cloth 80.

When the first-side edge contour A, the second-side edge contour B, and the center line contour C of the multilayer cloth 80 are formed, a first semi-finished product 85 of face mask having a complete edge contour is completed. Subsequent, the cloth 80 is subject to cutting along the complete edge contour that has just formed to separate the first semi-finished product from the cloth 80 thereby forming an individual object, as shown in FIG. 6.

Preferably, the platform 100 is provided with a feed roller set 10, which is arranged at a rearward side of the first-side edge fusion module 20. The feed roller set 10 is arranged on the top surface of the platform 100 and comprises two brackets 15 and two feed rollers 11. The brackets 15 are mounted on the top surface of the platform 100. The feed rollers 11 are rotatably mounted between the brackets 15 and are vertically adjacent to each other for driving the multilayer cloth 80 through between the feed rollers 11 for conveying the multilayer cloth 80 in the forward direction toward the first-side edge fusion module 20.

Preferably, the platform 100 is provided wife a first conveyance roller set 40 arranged between the second-side edge fusion module 30 and the folding device 50. The first conveyance roller set 40 comprises two brackets 45 and two conveyance rollers 41. The brackets 45 are mounted on the top surface of the platform 100. The conveyance rollers 41 are rotatably mounted between the brackets 45 and are vertically adjacent to each other for driving the multilayer cloth 80 through between the conveyance rodeos 41 and conveying the multilayer cloth 80 toward the folding device 50.

Preferably, the guide board assembly 51 of the folding device 50 further comprises two support brackets 511 and a support roller 512. The support brackets 511 are mounted on the top surface of the platform 100 and are adjacent to the first conveyance roller set 40 in the forward direction. The support roller 512 is rotatably mounted between the support brackets 511 to support the multilayer cloth 80. The guide board 513 is mounted to the brackets 511.

Preferably, the grade roller set 52 further comprises two brackets 514 mounted to the top surface of the platform 100. The guide rollers 515 are rotatably mounted between the brackets 514.

Preferably, the platform 100 is further provided with a second conveyance roller set 60 arranged between the folding device 50 and the center line fusion module 70. The second conveyance roller set 60 comprises two brackets 65 and two conveyance rollers 61. The brackets 65 are mounted on the top surface of the platform 100. The conveyance rollers 61 are rotatably mounted between the brackets 65 and are vertically adjacent to each other for driving the multilayer cloth 80 through between the conveyance rollers 61 and conveying the multilayer cloth 80 toward the center line fusion module 70.

In the above arrangement, the first, second, and third pneumatic cylinders 22, 32, 72 and the first, second, and third ultrasonic heating device 23, 33, 73 can all be connected to automatic control facility, such as an industrial computer, to automatically drive the first, second and third fusion dies 25, 35, 75 to carry out fusion operation on the multilayer cloth. This eliminates the need of human labor for operating fusion facility thereby avoiding reduction of manufacturing quality and throughput of the first semi-finished product 85 caused by inconsistency resulted from manual operation. Consequently, the quality of the semi-finished product of the face mask can be enhanced and the costs reduced.

Referring to FIGS. 7 and 13, the mask cutting apparatus, broadly designated at 1000, is arranged next to the mask fusion apparatus at a location adjacent to the center line fusion module 70 to process a length of a mask material 120 for cutting the mask material 120 to form a plurality of second semi-finished products 122 of face mask and also clear off waste material 124 generated due to the cutting and formation of the second semi-finished products 122. The mask cutting apparatus 1000 comprises: a table, two carrier sets, two closing mechanisms 140, a cutting mechanism 150, two opening mechanisms 160, and a waste clearing device 170.

Figure 11A:
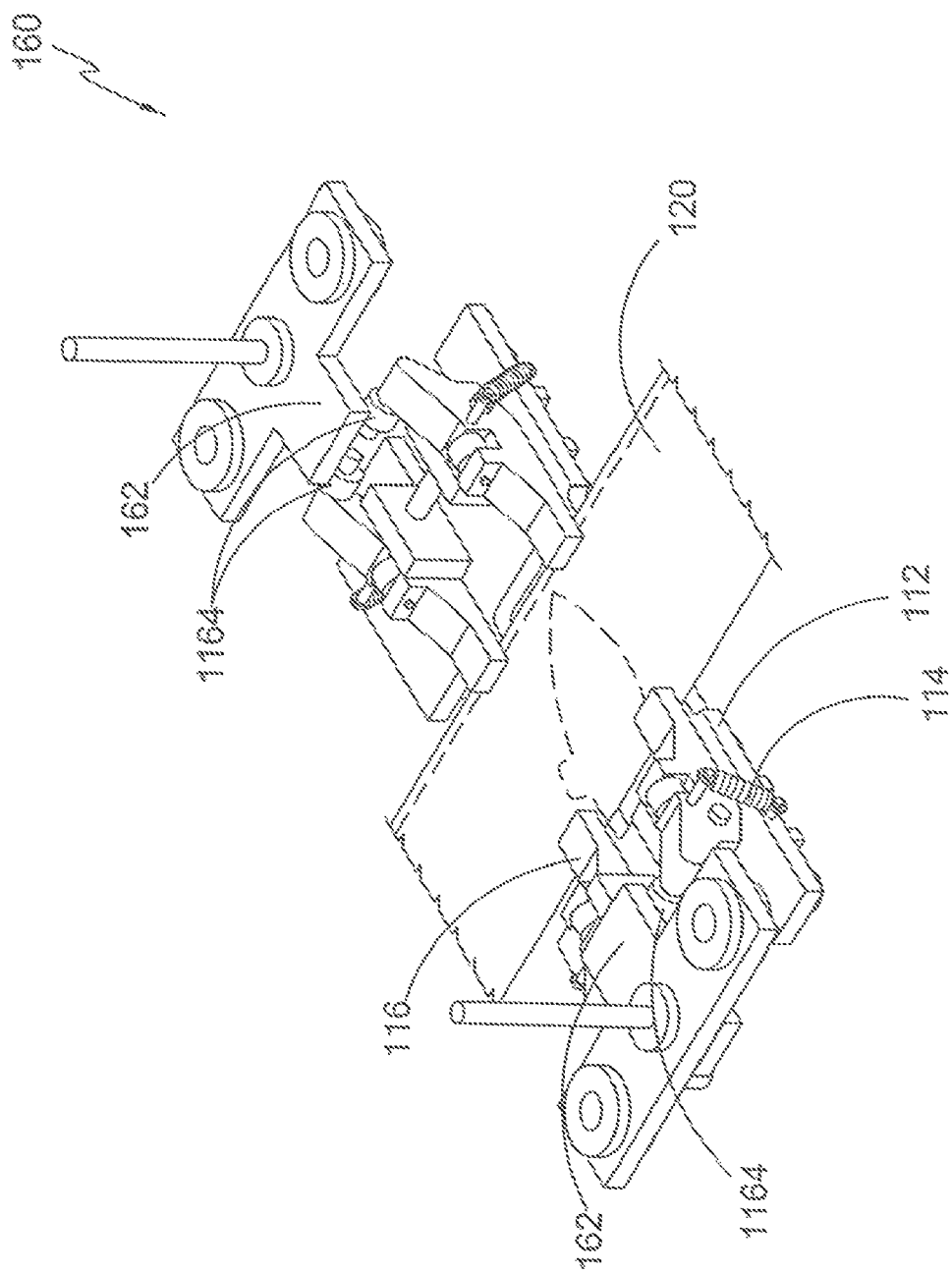
FIGS. 11A and 11B are perspective views illustrating the operation of releasing the mask material with opening mechanisms of the mask cutting apparatus of the present invention.

Also referring to FIGS. 7 and 11A, the table has a top surface on which two rails 130 are mounted. Two caterpillar track sets are also provided on the top surface of the table and corresponding to the rails 130 respectively. Each caterpillar track set comprises a plurality of rollers rotatably mounted to the table and a caterpillar band surrounding the rollers. Further, the table is provided with at least one pair of drive rollers 132, which are located between the rails 130 and are arranged in a vertically adjacent manner in order to clamp the mask material 120 for conveying the mask material 120 in a forward direction.

Referring to FIGS. 8A, 8B, 9A, and 9B, the carrier sets are respectively coupled to the caterpillar track sets mounted on the table for circulatory movement along die caterpillar tracks. Each carrier set comprises a plurality of carriers 110 arranged along the corresponding caterpillar band. Each carrier 110 comprises a chassis 112 and a plurality of clamps 116 pivotally mounted to lire chassis 112. The chassis 112 is coupled to the corresponding caterpillar band and is movable along the corresponding rail 130. A plurality of rollers 1122 are rotatably mounted to an underside of the chassis 112. The rollers 1122 are in rolling contact engagement with inner faces of the corresponding rails 130 to allow the chassis 112 to slide with respect to the rails 130. Each clamp 116 has an inner end forming a clamping member and an outer end to which a roller based driven member 1164 is rotatably mounted. Each clamp 116 is provided with a resilient element at an outer side thereof and the resilient element is arranged to bias the inner end of the clamp 116 toward an engaging condition where the clamping member of the inner end of the clamp 116 engages the chassis 112 or a separating condition where the inner end of the clamp 116 is biased away from the chassis 112, based on the angular position of the clamp 116 with respect to the chassis 112. In this way the mask material 120 can be selectively pinched between the clamping member of the clamp 116 and the chassis 112.

Figure 9A:
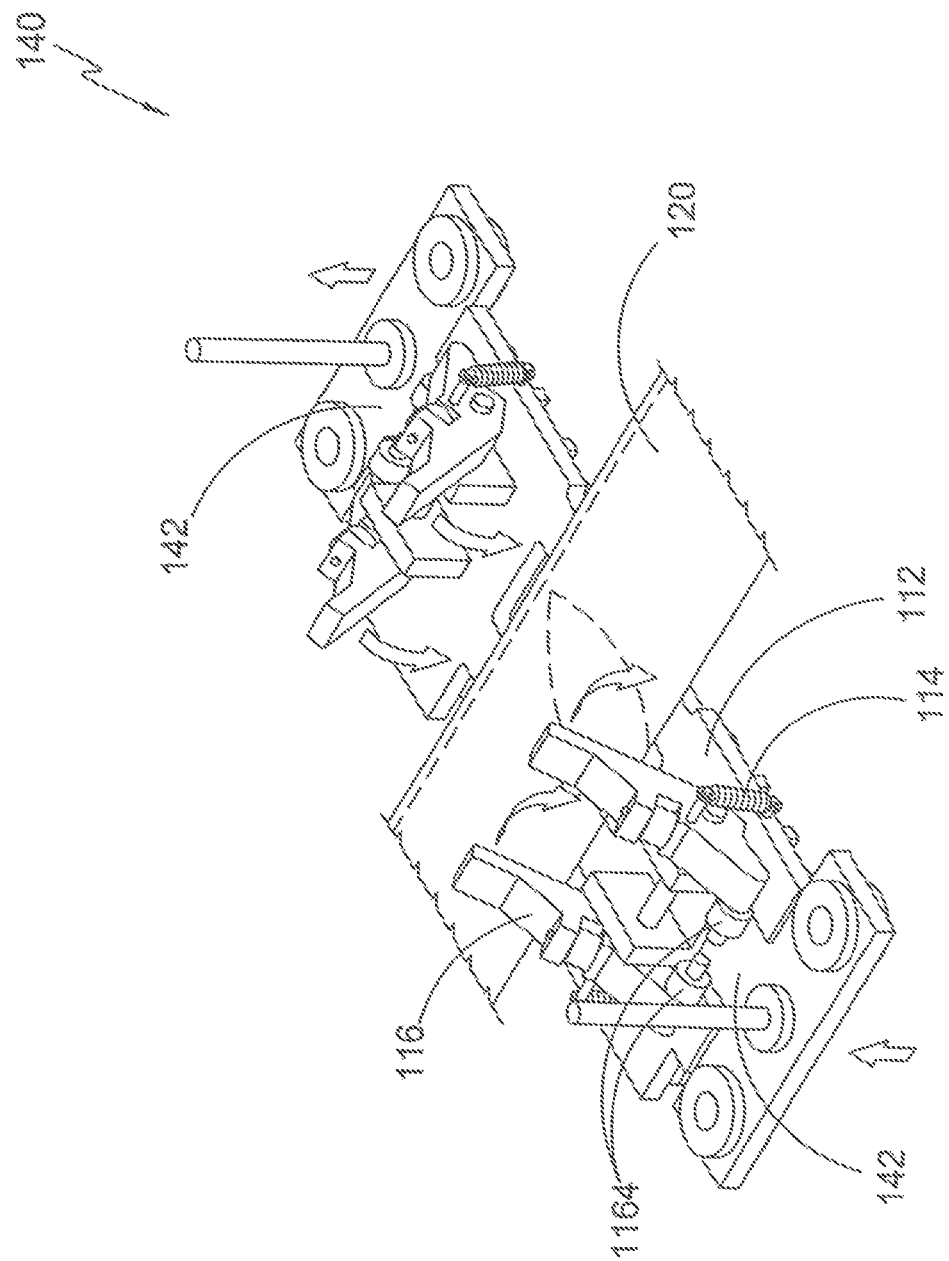
FIGS. 9A and 9B are perspective views illustrating clamping of mask material with the carriers.
Figure 9B:
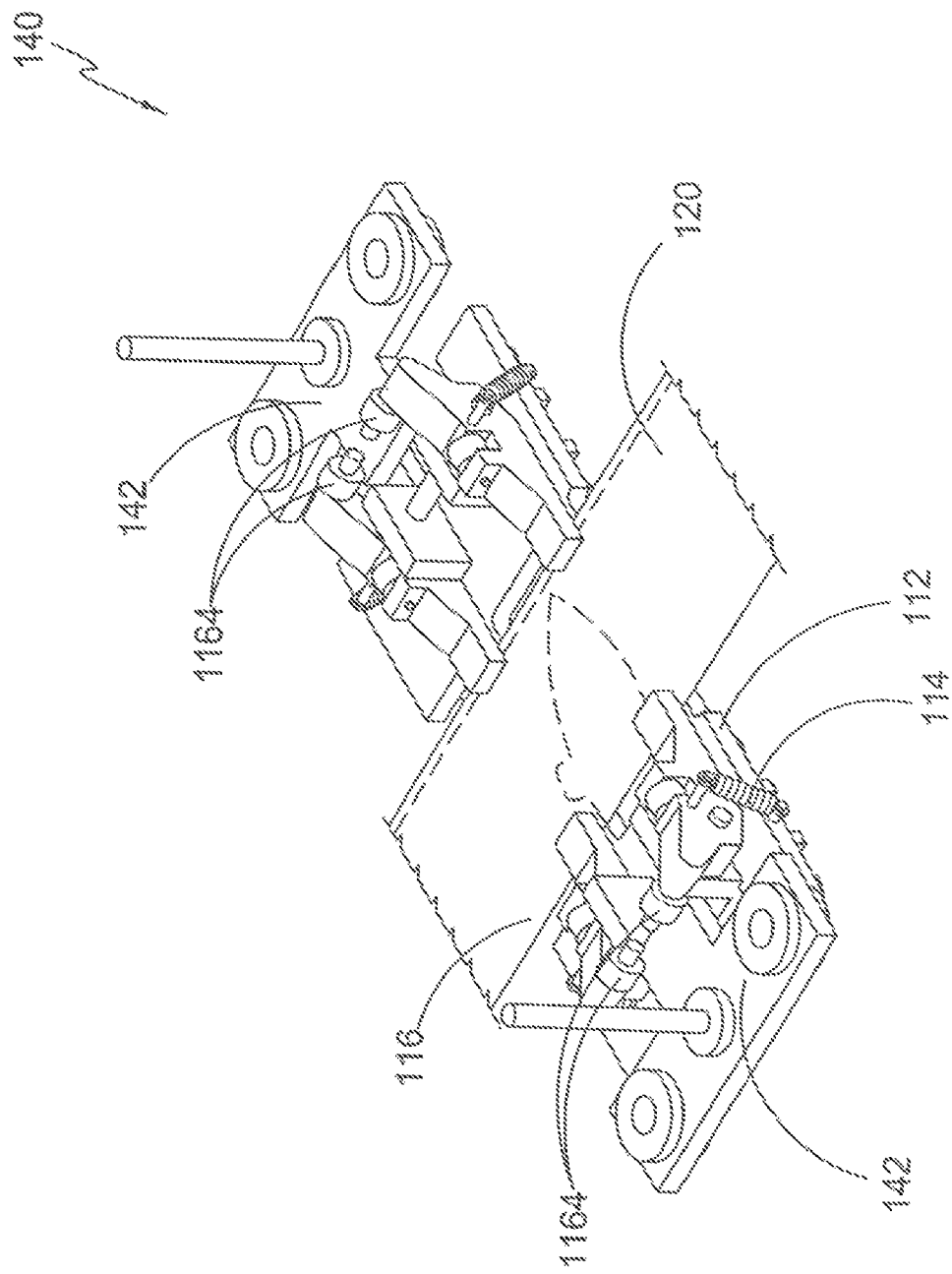

Referring to FIG. 9A, the closing mechanisms 140 are arranged on opposite edge portions of a rearward end portion of the table and corresponding to the caterpillar track sets respectively. Each closing mechanism 140 comprises a frame, a first pneumatic cylinder, and a push board 142. The frame is mounted to the table. The first pneumatic cylinder is mounted to a top end of the frame and has a vertically movable linear shaft. The push board 142 is mounted to an end of the linear shaft and is operable to engage and thus upward push the clamps 116 of the carrier 114 that is, at the rime of operation, moved along the caterpillar track to a location corresponding to the closing mechanism 140 so as to rotate the clamps 116 with respect to the chassis 112 thereby closing the clamps 116 to allow the clamps 116 and the chassis 112 of the carrier 110 to grip or pinch the mask material 120 therebetween.

Figure 10A:
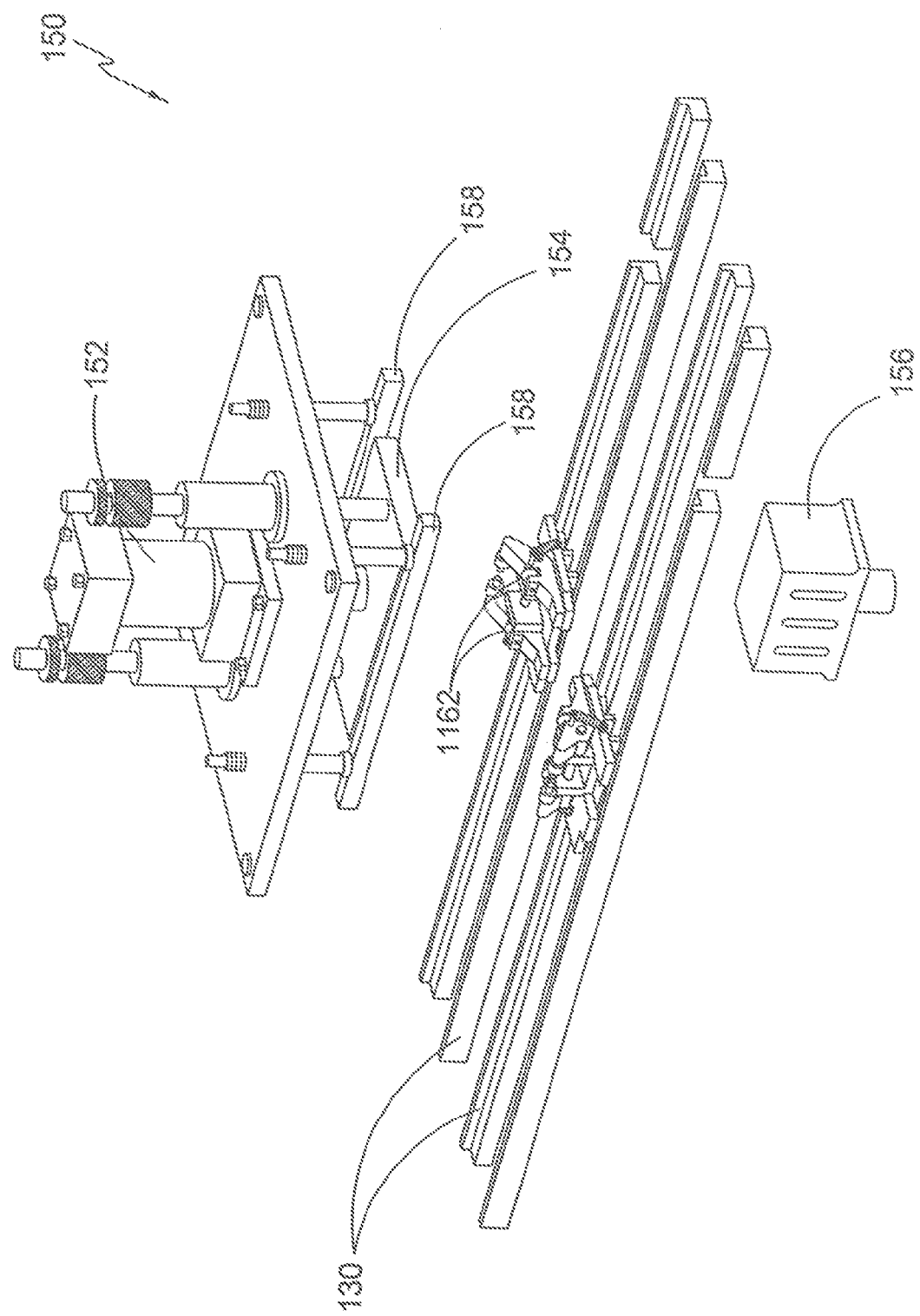
FIGS. 10A and 10B are perspective views of a cutting mechanism of the mask cutting apparatus of the present invention, illustrating the operation of the cutting mechanism.
Figure 10B:
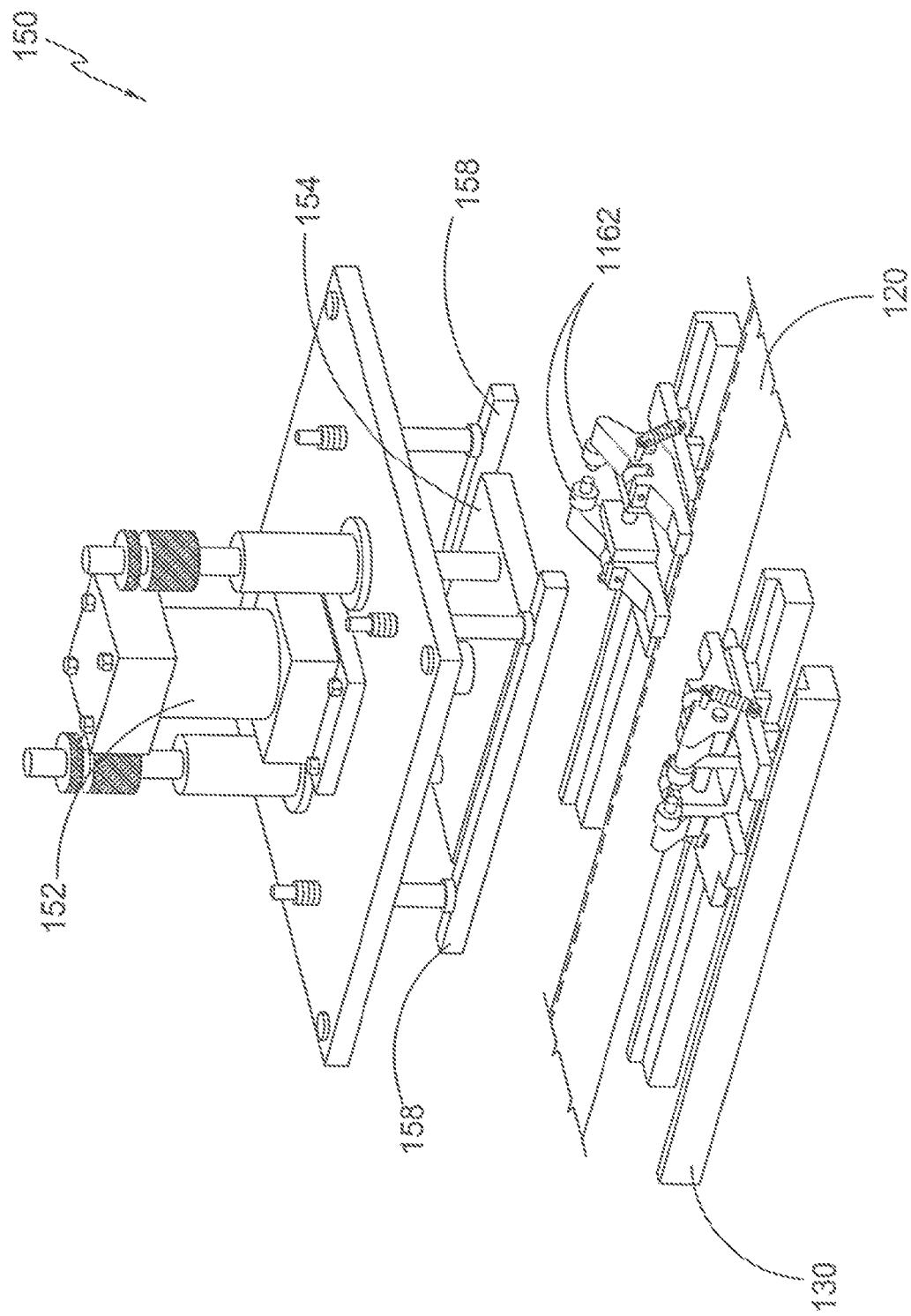

Also referring to FIGS. 10A and 10B, the cutting mechanism 150 is arranged on the table and located above the rails 130 and the carrier sets. The cutting mechanism 150 comprises a support frame, a cutter die cushion 156, an upper hydraulic cylinder 152, a cutter die 154, and two skid-resistant bars 158. The cutter die cushion 156 is arranged in the top surface of the table in a vertically movable manner. The upper hydraulic cylinder 152 is mounted to the support frame and is adjacent to the cutter die 154 and has a vertically movable linear shaft. The cutter die 154 is arranged at a location corresponding to a space between the two rails 130 and in alignment with the cutter die cushion 156 and the mask material 120. The cutter die 156 is mounted to a lower end of the linear shaft of the upper hydraulic cylinder 152 and is vertically movable therewith to cooperate with upward movement of the cutter die cushion 156 to clamp the mask material 120 in outer to carry out the cutting operation of the mask material 120. The skid-resistant bars 158 are mounted to a lower end of the support frame and are selectively put in abutting engagement with the mask material 120 located on the table for retaining the mask material 120 in position without undesired movement with respect to the table during the cutting operation.

Figure 11B:
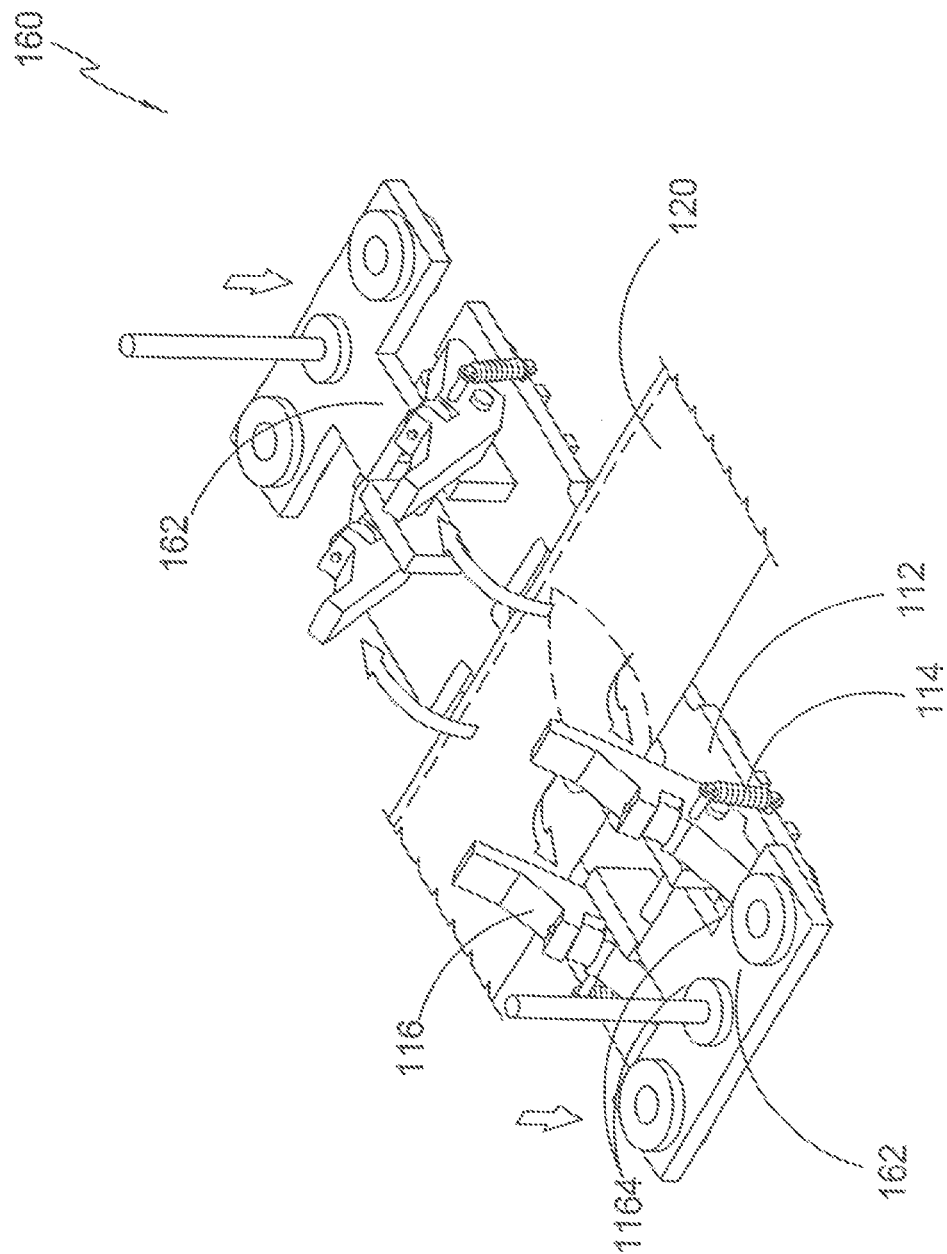

Also referring to FIGS. 11A and 11B, the opening mechanisms 160 are arranged on opposite edge portions of a forward end portion of the table and corresponding to the caterpillar track sets respectively and are adjacent to the cutting mechanism 150. Each opening mechanism 160 comprises a frame, a third pneumatic cylinder, and a depressing board 162. The frame is mounted to the table. The third pneumatic cylinder is mounted to a top end of the frame and has a vertically movable linear shaft. The depressing board 162 is mounted to an end of the linear shaft and is operable to downward depress the roller-based driven members 1164 of the clamps 116 of the carrier 110 that is moved along the caterpillar track to a location corresponding to the opening mechanism 160 so as to rotate the clamps 116 with respect to the chassis 112 to thereby open the clamps 116.

Also referring to FIG. 12, the waste clearing device 170 is arranged on the table at the forward end portion thereof and is adjacent, to the opening mechanisms 160. The waste clearing device 170 comprises a crossbar, a drive roller 174, a pneumatic cylinder, and a drive rod 172. The crossbar extends transversely across the table and is mounted between the frame of the opening mechanisms 160. The drive roller 174 is rotatably mounted to the crossbar to allow the waste material of the mask material to wrap therearound. The pneumatic cylinder is mounted to the crossbar and is adjacent to the drive roller 174. The drive rod 172 is coupled to the pneumatic cylinder in vertically movable manner to selectively depress against the waste material 124 so as to pull and drag the waste material 124.

In the above arrangement, the first pneumatic cylinder, the upper hydraulic cylinder 152, and the third pneumatic cylinder can be power-driven so as to control the operation of die push board 142, the depressing board 162, and the cutter die 154. Further, the carrier sets can be connected to a driving motor for self-circulatory movement. Thus, the operation of the mask cutting apparatus in accordance with the present invention can be carried out completely without intervening of human labor thereby realizing full automation, of production of semi-finished products of face masks, leading to reduction of labor costs and increasing of manufacturing speed and passing rate.

Although the present invention bus been described with reference to the preferred embodiment thereof, it is apparent to those skilled in the art that a variety of modifications and changes may be made without departing from the scope of the present invention which is intended to be defined by the appended claims.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A face mask manufacturing machine comprising a mask fusion apparatus, the mask fusion apparatus comprising:

a platform;

a first-side edge fusion module arranged on the platform, comprising a frame, at least one first pneumatic cylinder, a first fusion die, a first ultrasonic heating device, and a first die cushion, the frame being arranged on and extending from a top surface of the platform, the first pneumatic cylinder being mounted to the frame and having a vertically movable linear shaft, the first fusion module being mounted to a lower end of the linear shaft to press onto a multilayer cloth to form a first-side edge contour of the mask, the first ultrasonic heating device being mounted to the frame and coupled to the first fusion die in order to induce ultrasonic vibration on and thus heating the first fusion die to increase temperature of the first fusion die for heat-fusion of the first-side edge contour of the multilayer cloth, the first die cushion being arranged in the platform in a vertically movable manner at a location below the first fusion die;

a second-side edge fusion module arranged on the platform and adjacent to the first-side edge fusion module in a forward direction, comprising a frame, at least one second pneumatic cylinder, a second fusion die, a second ultrasonic heating device, and a second die cushion, the frame being arranged on and extending from the top surface of the platform, the second pneumatic cylinder being mounted to the frame and having a vertically movable linear shaft, the second fusion module being mounted to a lower end of the linear shaft to press onto the multilayer cloth to form a second-side edge contour of the mask, the second ultrasonic heating device being mounted to the frame and coupled to the second fusion die in order to induce ultrasonic vibration on and thus heating the second fusion die to increase temperature of the second fusion die for heat-fusion of the second-side edge contour of the multilayer cloth, the second die cushion being arranged in the platform in a vertically movable manner at a location below the second fusion die;

a folding device arranged on the platform and adjacent to the second-side edge fusion module in the forward direction, comprising a guide board assembly and a guide roller set, the guide board assembly being arranged on the platform and comprising a guide board, which has a forward end portion forming a conic shape and an expanded rearward end portion opposing the second-side edge fusion module for guiding the multilayer cloth toward the forward end portion thereof for folding the multilayer cloth, the guide roller set being arranged on the top surface of the platform and adjacent to the forward end portion of the guide board, the guide roller set comprising two guide rollers that are horizontally adjacent to each other for driving the folded multilayer cloth through therebetween; and a center line fusion module arranged on the top surface of the platform and adjacent to the folding device, the center line fusion module comprising a frame, at least one third pneumatic cylinder, a third fusion die, a third ultrasonic heating device, and a third die cushion, the frame being arranged on and extending from the top surface of the platform, the third pneumatic cylinder being mounted to the frame and having a vertically movable linear shaft, the third fusion module being mounted to a lower end of the linear shaft to press onto the multilayer cloth to form a center line contour of the mask, the third ultrasonic heating device being mounted on the frame and coupled to the third fusion die in order to induce ultrasonic vibration on and thus heating the third fusion die to increase temperature of the third fusion die for heat-fusion of the center line contour of the multilayer cloth, the third die cushion being arranged in the platform in a vertically movable manner at a location below the third fusion die.

2. The face mask manufacturing machine as claimed in claim 1, wherein the platform is provided with a feed roller set arranged at a rearward side of the first-side edge fusion module, the feed roller set being arranged on the top surface of the platform and comprising two brackets and two feed rollers, the brackets being mounted on the top surface of the platform, the feed rollers being rotatably mounted between the brackets and vertically adjacent to each other for driving the multilayer cloth through between the feed rollers for conveying the multilayer cloth in the forward direction toward the first-side edge fusion module.

3. The face mask manufacturing machine as claimed in claim 2, wherein the platform is provided with a conveyance roller set arranged between the second-side edge fusion module and the folding device, the conveyance roller set comprising two brackets and two conveyance rollers, the brackets being mounted on the top surface of the platform, the conveyance rollers being rotatably mounted between the brackets and vertically adjacent to each other for driving the multilayer cloth through between the conveyance rollers and conveying the multilayer cloth toward the folding device.

4. The race mask manufacturing machine as claimed in claim 3, wherein the guide board assembly of the folding device further comprises two support brackets and a support roller, the support brackets being mounted on the top surface of the platform and adjacent to the conveyance roller set in the forward direction, the support roller being rotatably mounted between the support brackets to support the multilayer cloth, the guide board being mounted to the brackets.

5. The face mask manufacturing machine as claimed in claim 4, wherein the guide roller set comprises two brackets mounted to the top surface of the platform, the guide rollers being rotatably mounted between the brackets.

6. The face mask manufacturing machine as claimed in claim 5, wherein the platform is provided with a conveyance roller set arranged between the folding device and the center line fusion module, the conveyance roller set comprising two brackets and two conveyance rollers, the brackets being mounted on the top surface of the platform, the conveyance rollers being rotatably mounted between the brackets and vertically adjacent to each other for driving the multilayer cloth through between the conveyance rollers and conveying the multilayer cloth toward the center line fusion module.

7. The face mask manufacturing machine as claimed in claim 1 further comprising a mask cutting apparatus, which is arranged next to the mask fusion apparatus at a location adjacent to the center line fusion module, the mask cutting apparatus comprising:

a table having a top surface on which two rails are mounted, two caterpillar track sets being further provided on the top surface of the table and corresponding to the rails respectively, each caterpillar track set comprising a plurality of rollers rotatably mounted to the table and a caterpillar band surrounding the rollers;

two carrier sets respectively coupled to the caterpillar track sets for circulatory movement along the caterpillar track, each carrier set comprising a plurality of carriers arranged along the corresponding caterpillar band, each carrier comprising a chassis and a plurality of clamps pivotally mounted to the chassis for selectively clamping a mask material;

two closing mechanisms arranged on opposite edge portions of a rearward end portion, of the table and corresponding to the caterpillar track sets respectively, each, closing mechanism comprising a frame, a first pneumatic cylinder, and a push board, the frame being mounted to the table, the first pneumatic cylinder being mounted to a top end of the frame and having a vertically movable linear shaft, the push board being mounted to an end of the linear shaft and being operable to engage and thus upward push the clamps of the carrier that is moved along the caterpillar track to a location corresponding to the closing mechanism so as to rotate the clamps with respect to the chassis thereby closing the clamps to allow the clamps and the chassis of the carrier to grip the mask material therebetween;

a cutting mechanism arranged on the table and located above the rails and the carrier sets, the cutting mechanism comprising a support frame, a cutter die cushion, an upper hydraulic cylinder, and a cutter die, the cutter die cushion being arranged in the top surface of the table in a vertically movable manner, the upper hydraulic cylinder being mounted to the support frame and adjacent to the cutter die and having a vertically movable linear shaft, the cutter die being arranged at a location corresponding to a space between the two rails and in alignment with the cutter die cushion and die mask material, the cutter die being mounted to a lower end of the linear shaft of the upper hydraulic cylinder and being vertically movable therewith to cooperate with upward movement of the cutter die cushion to clamp the mask material for cutting;

two opening mechanisms arranged on opposite edge portions of a forward end portion of the table and corresponding to the caterpillar track sets respectively and adjacent to the cutting mechanism, each opening mechanism comprising a frame, a third pneumatic cylinder, and a depressing board, the home being mounted to the table, the third pneumatic cylinder being mounted to a top end of the frame and having a vertically movable linear shaft, the depressing board being mounted to an end of the linear shaft and being operable to downward depress the clamps of the carrier that is moved along the caterpillar track to a location corresponding to the opening mechanism so as to rotate the clamps with respect to the chassis to thereby open the clamps; and a waste clearing device arranged on the table at the forward end portion thereof and adjacent to the opening mechanisms, the waste clearing device comprising a crossbar, a drive roller, a pneumatic cylinder, and a drive rod, the crossbar being mounted between the frames of the opening mechanisms, the drive roller being rotatably mounted to the crossbar to allow a length of waste of the mask material to wrap therearound, the pneumatic cylinder being mounted to the crowbar and adjacent to the drive roller, the drive rod being coupled to the pneumatic cylinder in vertically movable manner to selectively depress against the waste so as to pull and drag the waste.

* * * * *